(12) United States Patent
Farr

(10) Patent No.: US 10,106,095 B1
(45) Date of Patent: Oct. 23, 2018

(54) MOUNTING SUPPORT BRACKET TO SECURE STORAGE CART TO UTILITY VEHICLE

(71) Applicant: Jeffry Lee Farr, Huntsville, TX (US)

(72) Inventor: Jeffry Lee Farr, Huntsville, TX (US)

( * ) Notice: Subject to any disclaimer, the term of this patent is extended or adjusted under 35 U.S.C. 154(b) by 0 days.

(21) Appl. No.: 15/423,162

(22) Filed: Feb. 2, 2017

(51) Int. Cl.
*B60R 9/02* (2006.01)
*B60P 1/64* (2006.01)

(52) U.S. Cl.
CPC .............. *B60R 9/02* (2013.01); *B60P 1/6409* (2013.01)

(58) Field of Classification Search
CPC .... B60R 9/02; B60R 9/06; B60R 9/08; B60R 9/00; B60P 1/6409
See application file for complete search history.

(56) References Cited

U.S. PATENT DOCUMENTS

| 4,411,461 | A * | 10/1983 | Rosenberg | B60R 9/06 211/17 |
| 4,815,638 | A * | 3/1989 | Hutyra | B60R 9/10 224/516 |
| 6,845,894 | B1 * | 1/2005 | Vyvoda | B60R 9/02 224/405 |
| 7,641,086 | B2 * | 1/2010 | Green | B60P 3/07 224/403 |

* cited by examiner

*Primary Examiner* — Corey Skurdal
(74) *Attorney, Agent, or Firm* — Plager Schack LLP; Mark H. Plager; Eric Liou

(57) ABSTRACT

A mounting support bracket permits an attachment of a storage cart on a side wall of a utility vehicle. The mounting support bracket includes a base bar coupled to the side wall of the utility vehicle and oriented to extend horizontally, a pair of adjustable bar members slidably mounted to the base bar and oriented to extend vertically, each adjustable bar member in the pair of bar members designed to slidably adjust in a lateral direction, upward direction and downward direction relative to the base bar to a desired position, and a pair of hook members coupled to the pair of adjustable bar members. The hook members support the storage cart thereon, thereby permitting the storage cart to be secured to the utility vehicle.

10 Claims, 3 Drawing Sheets

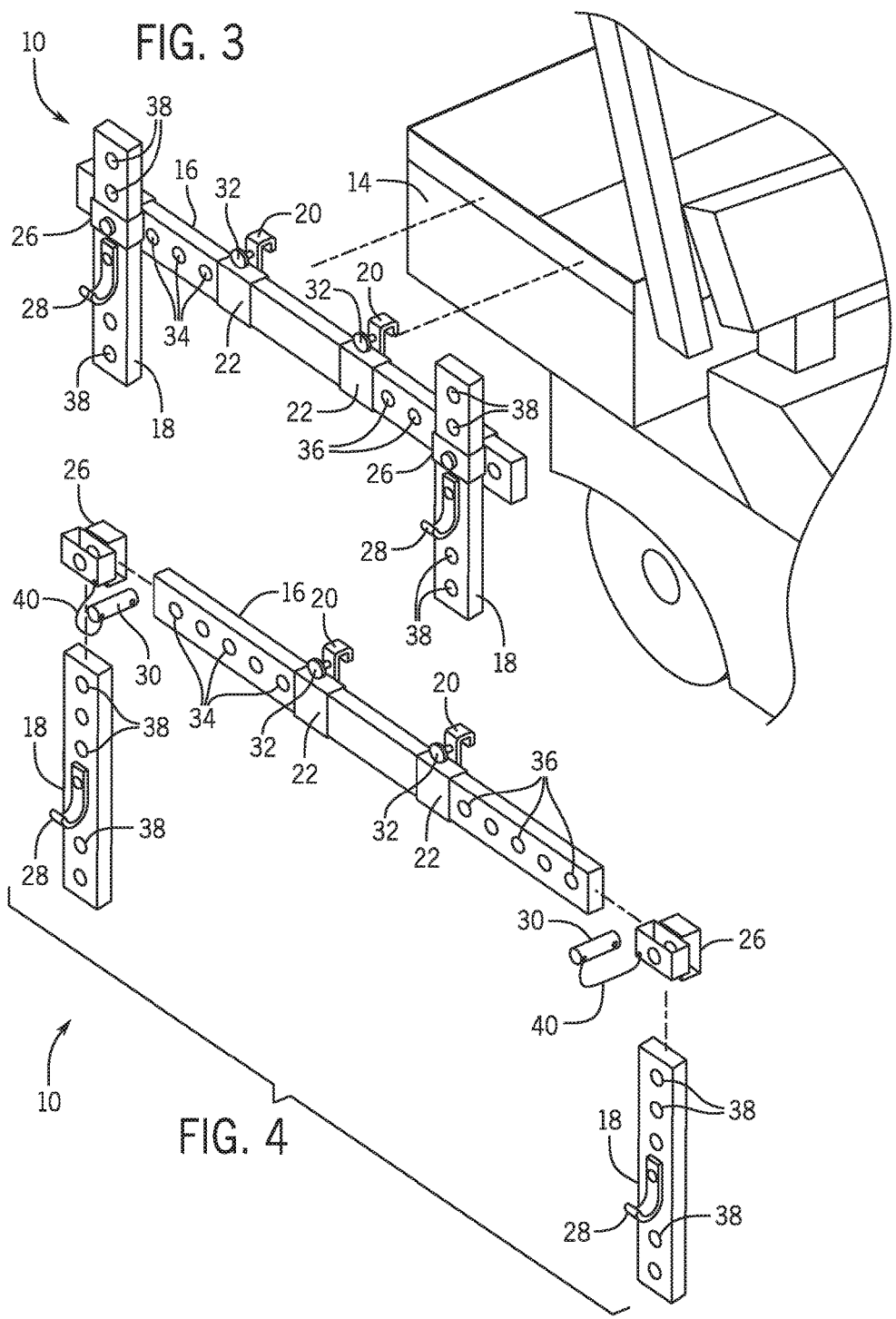

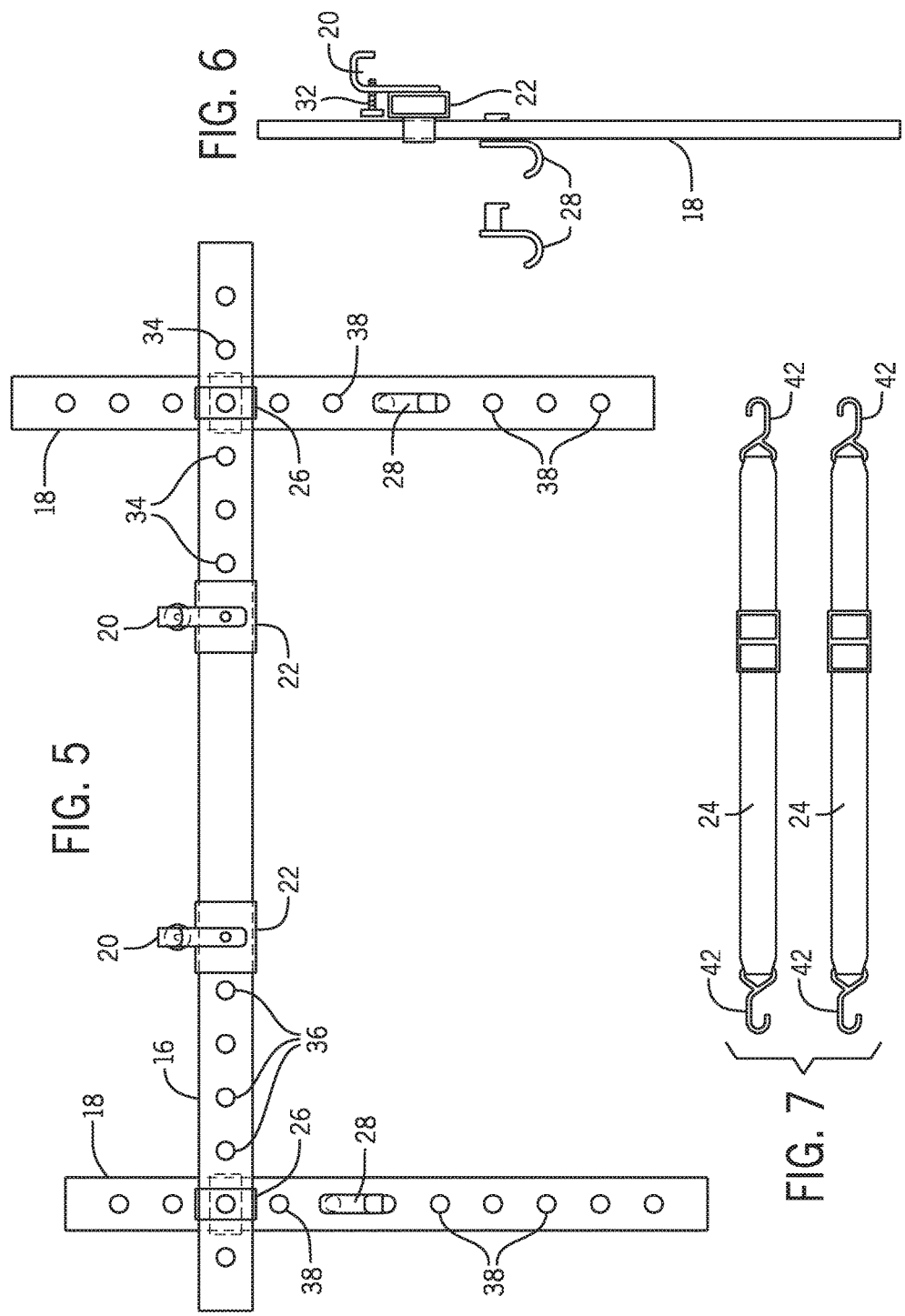

MOUNTING SUPPORT BRACKET TO SECURE STORAGE CART TO UTILITY VEHICLE

BACKGROUND

The embodiments herein relate generally to mounting devices for securing a storage cart to a utility vehicle. These storage carts are used in a variety of industries including, but not limited to, catering services, landscape services, shipping services and storage services in warehouses, docks, and the like.

Individuals use storage carts such as push carts, wheel barrows, landscape vessels, and the like, to store or transport a variety of items. In many instances individuals need to transport these storage carts from one location to another with vehicles such as utility golf carts or all-terrain vehicles. The standard procedure is to place these one or more storage carts in the bed of the vehicle. However, this is undesirable because valuable storage space in the vehicle's bed is wasted, thereby eliminating space to carry other items. This results in multiple required trips, which reduces efficiency and drives operating costs and customer fees up. Further, manually lifting and maneuvering the storage cart into the vehicle's bed places the user in an awkward position and increases the likelihood he/she suffers an injury to the back, hands, arms, or other body areas.

Other alternatives include towing the storage cart behind the vehicle. However, this requires the use and installation of additional equipment such as tow hitches and balls. Often times the use of this equipment is not practical for short trips and many applications.

As such, there is a need in the industry for a mounting support bracket that effectively secures a storage cart such as a push cart, wheel barrow, or the like, to a side wall of the utility vehicle. There is a further need for the mounting support bracket to permit the easy securement and removal of the storage cart from the vehicle without placing the user in an awkward body position that promotes injuries.

SUMMARY

A mounting support bracket configured to permit attachment of a storage cart on a side wall of a utility vehicle in a secured position is provided. The mounting support bracket comprises a base bar coupled to the side wall of the utility vehicle and oriented to extend horizontally, the base bar comprising a first end portion and a second end portion, a pair of adjustable bar members slidably mounted to the base bar and oriented to extend vertically, the first bar member in the pair of adjustable bar members coupled to the first end portion of the base bar and the second bar member in the pair of adjustable bar members coupled to the second end portion of the base bar, each adjustable bar member in the pair of bar members configured to slidably adjust in a lateral direction, upward direction and downward direction relative to the base bar to a desired position, and a pair of hook members coupled to the pair of adjustable bar members, wherein the hook members are configured to support the storage cart thereon, thereby permitting the storage cart to be secured to the utility vehicle.

BRIEF DESCRIPTION OF THE FIGURES

The detailed description of some embodiments of the invention will be made below with reference to the accompanying figures, wherein the figures disclose one or more embodiments of the present invention.

FIG. 3 depicts an exploded view of certain embodiments of the mounting support bracket;

FIG. 4 depicts an exploded view of certain embodiments of the mounting support bracket;

FIG. 5 depicts a rear view of certain embodiments of the mounting support bracket;

FIG. 6 depicts a side view of certain embodiments of the mounting support bracket; and FIG. 7 depicts an elevation view of certain embodiments of the mounting support bracket.

DETAILED DESCRIPTION OF CERTAIN EMBODIMENTS

Figure 1:
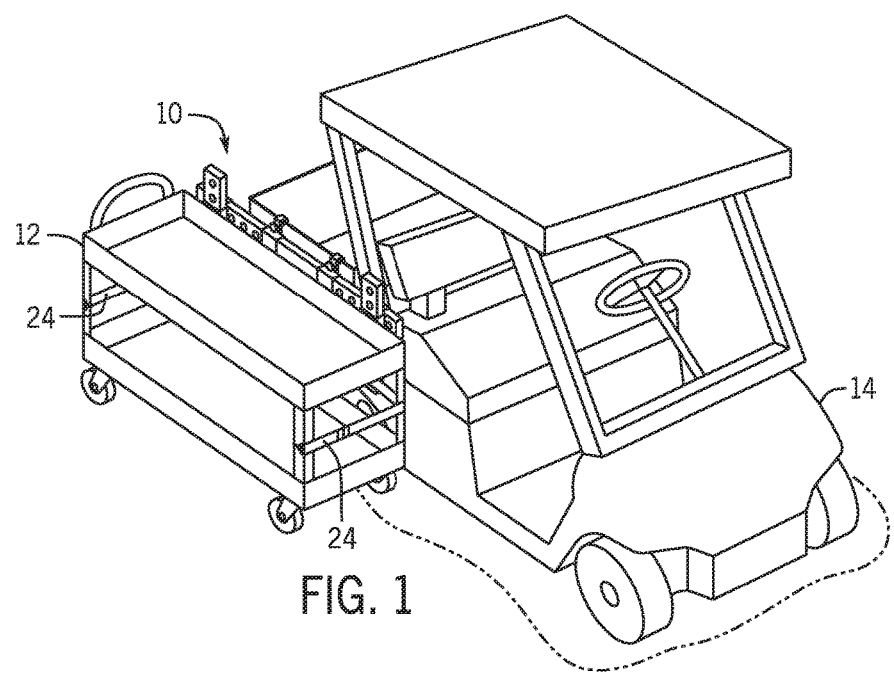
FIG. 1 depicts a front perspective view of certain embodiments of the mounting support bracket shown in use.
Figure 2:
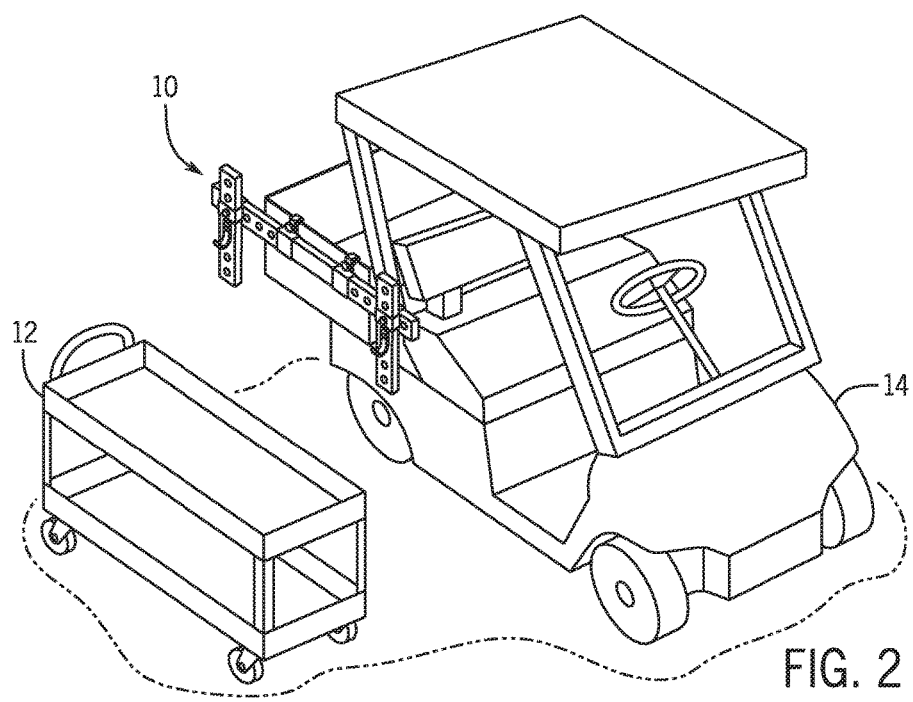
FIG. 2 depicts an exploded view of certain embodiments of the mounting support bracket.

As depicted in FIGS. 1-2, mounting support bracket 10 is configured for use with a vehicle such as utility golf cart 14 to transport storage cart 12. In one embodiment, storage cart 12 is a four-wheel push cart. However, storage cart 12 may be other storage members such as wheel barrows, landscape vessels, or the like, in other embodiments (not shown). Mounting support bracket 10 is designed to permit the easy attachment and removal of storage cart 12 from a side wall of utility golf cart 14. In certain embodiments, straps 24 are used to provide additional support to storage cart 12 when secured to utility golf cart 14.

As depicted in FIGS. 3-5, mounting support bracket 10 generally comprises horizontal base bar member 16, vertical bar members 18, locking devices 22 and snap-in hooks 28. Horizontal base bar member 16 is preferably made from aluminum or carbon plastic and comprises first opening set 34 on a first end and second opening set 36 on a second end. First and second opening sets 34, 36 comprise openings disposed through horizontal base bar member 16. A pair of locking devices 22 are coupled to an intermediate portion of horizontal base bar member 16. Each locking device 22 comprises a sleeve disposed around horizontal base bar member 16 and clamp hook 20 coupled thereto. Each clamp hook 20 comprises thumbscrew 32. Clamp hooks 20 are configured to secure around a top edge of a side wall of utility golf cart 14.

Vertical bar members 18 are preferably made from aluminum or carbon plastic and are slidably mounted to horizontal base bar member 16 by slide connectors 26. Each vertical bar member 18 comprises a plurality of openings 38 disposed through and spaced evenly throughout the member. Slide connector 26 comprises a pair of sleeves configured to receive both vertical bar member 18 and horizontal base bar member 16. The sleeves of each slide connector 26 comprise openings configured to receive locking pin 30. Vertical bar member 18 and horizontal base bar member 16 are oriented generally perpendicular to each other when the bar members are disposed within the sleeves of slide connector 26.

Vertical bar member 18 and horizontal bar member 16 are configured to slidably adjust within the sleeves of slide connector 26. As a result, each vertical bar member 18 is able to slidably adjust in a lateral direction, upward direction and downward direction relative to horizontal base bar member 16. This permits vertical bar members 18 to adjust to a desired position to support storage cart 12. To secure vertical bar member 18 and horizontal bar member 16 in the desired position, one of the openings 38 in vertical bar member 18 is aligned with one of the openings in either first opening set 34 or second opening set 36 of horizontal bar member 16. Locking pin 30 is then disposed within the aligned openings and openings in slide connector 26. In one embodiment, each locking pin 30 is attached to slide connector 26 by lanyard 40 as shown in FIG. 4. This prevents a misplacement of locking pin 30 when not in use. As depicted in FIGS. 3-4 and 6, snap-in hooks 28 are secured to any openings 38 in vertical bar members 18 to a desired matching height.

In operation, mounting support bracket 10 is coupled to utility golf cart 14 by securing clamp hooks 20 on horizontal base bar member 16 around a top edge of a side wall of utility golf cart 14 as shown in FIG. 2. Each vertical bar member 18 is adjusted to the desired position and locked in place via slide connector 26 and locking pin 30. Snap-in hooks 28 are secured to the desired openings 38 in vertical bar members 18. Once mounting support bracket 10 is assembled, storage cart 12 is disposed on mounting support bracket 10 and coupled to snap-in hooks 28 as shown in FIG. 1.

Straps 24 may be used to provide additional support when storage cart 12 is secured to mounting support bracket 10. As shown in FIG. 7, each strap 24 comprises strap hooks 42 on opposing ends and comprises an adjustment mechanism to adjust the length of strap 24. Strap hooks 42 are configured to secure to any portion of storage cart 12 and mounting support bracket 10 such as openings 38 in vertical bar members 18.

It shall be appreciated that the components of mounting support bracket 10 described in several embodiments herein may comprise any alternative known materials in the field and be of any color, size and/or dimensions. It shall be appreciated that the components of mounting support bracket 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A mounting support bracket configured to permit attachment of a storage cart on a side wall of a utility vehicle in a secured position, the mounting support bracket comprising:
    a base bar coupled to the side wall of the utility vehicle and oriented to extend horizontally, the base bar comprising a first end portion and a second end portion;
    a pair of adjustable bar members slidably mounted to the base bar and oriented to extend vertically, the first bar member in the pair of adjustable bar members coupled to the first end portion of the base bar and the second bar member in the pair of adjustable bar members coupled to the second end portion of the base bar, each adjustable bar member in the pair of bar members configured to slidably adjust in a lateral direction, upward direction and downward direction relative to the base bar to a desired position; and
    a pair of hook members directly coupled to the pair of adjustable bar members, each hook member in the pair of hook members adjustably secured to one of a plurality of height positions along one of the pair of adjustable bar members, wherein the hook members are configured to support the storage cart thereon, thereby permitting the storage cart to be secured to the utility vehicle.

2. The mounting support bracket of claim 1, further comprising a pair of sleeve members coupled to the base bar, each sleeve member in the pair of sleeve members comprising a clamp hook coupled thereto, wherein the clamp hook is configured to engage with the side wall of the utility vehicle.

3. The mounting support bracket of claim 2, wherein each clamp hook comprises an adjustable thumbscrew.

4. The mounting support bracket of claim 3, wherein the first end portion of the base bar comprises a first set of openings disposed therethrough, the second end portion of the base bar comprises a second set of openings disposed therethrough, and each adjustable bar member in the pair of bar members comprises a plurality of openings disposed therethrough.

5. The mounting support bracket of claim 4, further comprising a first slide connector coupled to the first bar member and first end portion of the base bar and a second slide connector coupled to the second bar member and second end portion of the base bar, each slide connector configured to receive a locking pin that extends through one of the plurality of openings in either bar member and one of the openings in either the first or second sets of openings in the base bar.

6. The mounting support bracket of claim 5, wherein each locking pin is coupled to the slide connector by a lanyard.

7. The mounting support bracket of claim 6, wherein each hook member in the pair of hook members is detachably coupled to one of the plurality of openings in either one of the first or second adjustable bar members.

8. The mounting support bracket of claim 7, further comprising a pair of straps coupled to the mounting support bracket and the storage cart, each strap comprising a first strap hook coupled to a first end of the strap and a second strap hook coupled to a second end of the strap.

9. A mounting support bracket configured to permit attachment of a storage cart on a side wall of a utility vehicle in a secured position, the mounting support bracket comprising:
    a base bar coupled to the utility vehicle and oriented to extend horizontally, the base bar comprising a first end portion and a second end portion;
    a pair of sleeve members coupled to the base bar, each sleeve member in the pair of sleeve members comprising a clamp hook coupled thereto that is configured to engage with the side wall of the utility vehicle;
    a pair of adjustable bar members slidably mounted to the base bar and oriented to extend vertically, the first bar member in the pair of adjustable bar members coupled to the first end portion of the base bar and the second bar member in the pair of adjustable bar members coupled to the second end portion of the base bar, each adjustable bar member in the pair of bar members configured to slidably adjust in a lateral direction, upward direction and downward direction relative to the base bar to a desired position; and
    a pair of hook members directly coupled to the pair of adjustable bar members, wherein the hook members are configured to support the storage cart thereon, thereby permitting the storage cart to be secured to the utility vehicle.

10. A mounting support bracket configured to permit attachment of a storage cart on a side wall of a utility vehicle in a secured position, the mounting support bracket comprising:

a base bar coupled to the side wall of the utility vehicle and oriented to extend horizontally, the base bar comprising a first end portion and a second end portion;

a pair of sleeve connectors coupled to the base bar, the first sleeve connector in the pair of sleeve connectors coupled to the first end portion of the base bar and the second sleeve connector in the pair of sleeve connectors coupled to the second end portion of the base bar, each sleeve connector in the pair of sleeve connectors comprising a first sleeve slidably mounted to the base bar and a second sleeve coupled to the first sleeve, the first sleeve comprising a first central axis and the second sleeve comprising a second central axis, the first central axis of the first sleeve oriented generally perpendicular to the second central axis of the second sleeve, a pair of adjustable bar members coupled to the pair of second sleeves of the pair of sleeve connectors, each adjustable bar member in the pair of adjustable bar members slidably mounted to the second sleeve of one of the pair of sleeve connectors and oriented to extend vertically, wherein the pair of sleeve connectors permit the pair of adjustable bar members to slidably adjust in a lateral direction, upward direction and downward direction relative to the base bar to a desired position; and a pair of hook members directly coupled to the pair of adjustable bar members, wherein the hook members are configured to support the storage cart thereon, thereby permitting the storage cart to be secured to the utility vehicle.

\* \* \* \* \*